Oct. 25, 1938.   A. E. DEMPSEY, JR   2,134,107
AIR CONDITIONING FOR VEHICLES
Original Filed Dec. 3, 1932   3 Sheets-Sheet 3

Inventor:
Arthur E. Dempsey Jr.
By: Cox & Moore attys

Patented Oct. 25, 1938

2,134,107

UNITED STATES PATENT OFFICE 2,134,107

AIR CONDITIONING FOR VEHICLES

Arthur E. Dempsey, Jr., Council Bluffs, Iowa, assignor, by mesne assignments, to North American Car Corporation, Chicago, Ill., a corporation of Illinois Original application December 3, 1932, Serial No. 645,552. Divided and this application November 8, 1934, Serial No. 752,034. In the Union of South Africa March 10, 1934

15 Claims. (Cl. 257—3)

My invention relates in general to air conditioning and has more particular reference to temperature control of the atmosphere in compartments, more specifically in compartments used for the transportation or storage of perishable materials, the invention relating even more especially to the temperature control in refrigerated vehicles.

Among the objects of my invention are to provide temperature control means for maintaining the temperature in a refrigerated car or vehicle within a predetermined range whether the car is in transit or stationary; to provide a refrigerating apparatus adapted to maintain a conditioned atmosphere below a predetermined temperature and cooperatively associated heating means operable to maintain the atmosphere above a predetermined minimum temperature; to provide a cold storage device, including cooling coils embedded in a suitable, lightweight, solid, cold storage material having high specific heat whereby to store potential refrigerating energy in condition for liberation as and when required; to provide means for selectively powering both the heating and cooling systems from a generator driven by the movement of the car when in transit and from an external source of electrical power when the car is stationary; to operate the heating and refrigerating system by means of uni-directional electrical current while the car is in transit and by means of alternating current from a commercial power line when the car is stationary; to provide means driven from the axle for circulating air in the car in order to promote the operating efficiency of the heating and cooling means; to provide switching means for operating the heating, cooling, and air-circulating apparatus selectively from an axle-driven, direct-current generator, or from an external source of alternating current power, said switching means including the arrangement of the heating and air circulating elements whereby the same may be operated at full heat or at fractional heating capacity; to provide a temperature control system for a vehicle compartment having an electrically operated heating and refrigerating apparatus, and an air circulating device wherein means is provided for applying electric power to the air circulating device either when the refrigerating apparatus is in operation, or when the electric heater is in operation; to provide a temperature control system for a vehicle having a compartment provided with means to add heat to or subtract heat from said compartment, and with air circulating means operable when a maximum amount of heat is to be added or subtracted, the air circulating means being inoperative when less than such maximum heat is being transferred; to provide an air conditioning mechanism for the refrigeration compartment of a vehicle which comprises both alternating and direct current sources of power, heaters and blowers with electrical control mechanism for operating the heaters and blowers in parallel from the direct current system of the vehicle and in series from the alternating current system of the vehicle; to provide a temperature conditioning mechanism for movable vehicles including cooling means and heating means and air blowing means together with electrical control devices therefore with inter-control mechanism for operating the blowers in association with the heaters and in association with the cooling means in a selected manner while preventing the operation of the cooling means when the blowers are operatively associated with the heaters and preventing the operation of the heaters when the blowers are operatively associated with the cooling means, whereby to provide a system of electrical control for an air conditioning system including automatically operated switch mechanism for selectively and automatically operating the cooling and/or heating means from a direct current source and/or from an alternating current source.

Numerous other objects and advantages of the invention will be apparent from the following description, which, taken in connection with the accompanying drawings, discloses a preferred embodiment of the invention.

Referring to the drawings.

To illustrate my invention I have shown on the drawings, a preferably insulated casing 11 comprising any type of compartment 12 having temperature control apparatus built in accordance with the teachings of my present invention.

The casing 11, in the illustrated embodiment, preferably comprises the body of a railroad refrigerator car and is mounted on wheels 13. The temperature control apparatus preferably includes a system for the circulation of any suitable refrigerating medium, such as ammonia, sulphur dioxide, ethyl chloride, or any other suitable medium; the system includes a compressor 15, a condenser 17, cooling coils 19 and cold storage devices 21 located in any suitable or convenient position on or in the casing, there being preferably a coil 19 and a cold storage device 21 behind partitions or bulkheads 14 at each of the opposite ends of the casing 11 although of course, the coils 19 and the devices 21 may be located on the side walls or roof of the compartment, or in any other suitable position in the compartment, if desired. The bulkheads preferably have openings 16 and 18 respectively near the floor and near the ceiling of the compartment to facilitate the circulation of air between the compartment and the cooling devices 19 and 21. The system also includes suitable piping or conduits 23 for connecting the compressor, condenser and cooling devices 19 and 21 in a circulating system.

The coils 19 and the devices 21 at the opposite ends of the compartment are arranged for parallel operation and a temperature regulated control valve 25 is provided to direct the flow of the refrigerating medium either to the refrigerating coils 19, or to the cold storage devices 21.

The refrigerating medium is circulated in the system from the compressor 15 through a pressure-limit switch 27, an oil intercepter 29, and the coils 31 of the condenser, thence through an expansion valve 24 and the control valve 25, thence either through the parallel circuits 33, including the coils 19 at opposite ends of the storage compartment, or through the parallel circuits 35 through the cold storage devices 21 at opposite ends of the compartment and finally back through the return conduit 37 to the inlet of the compressor 15.

Figure 1:
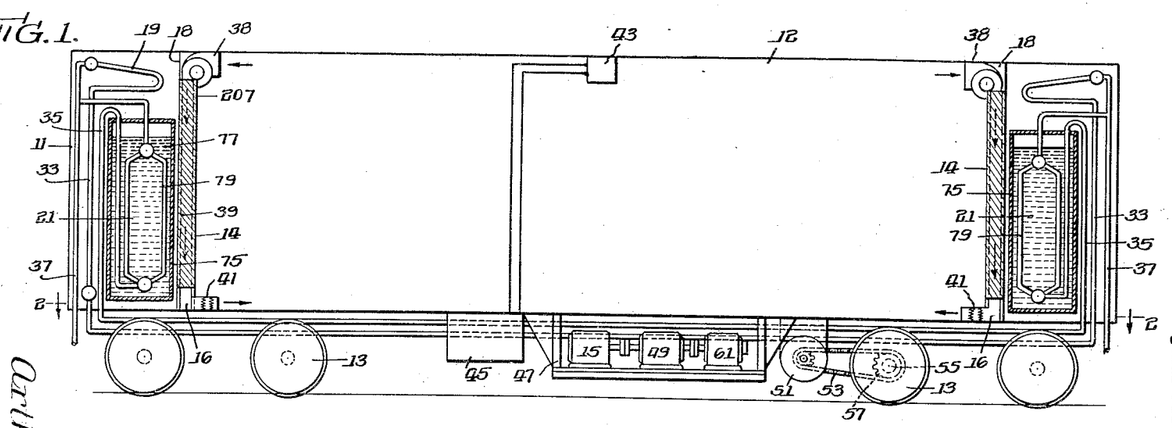
Fig. 1 is a sectional view taken longitudinally through a railroad refrigerator car to illustrate a preferred embodiment of my invention.
Figure 2:
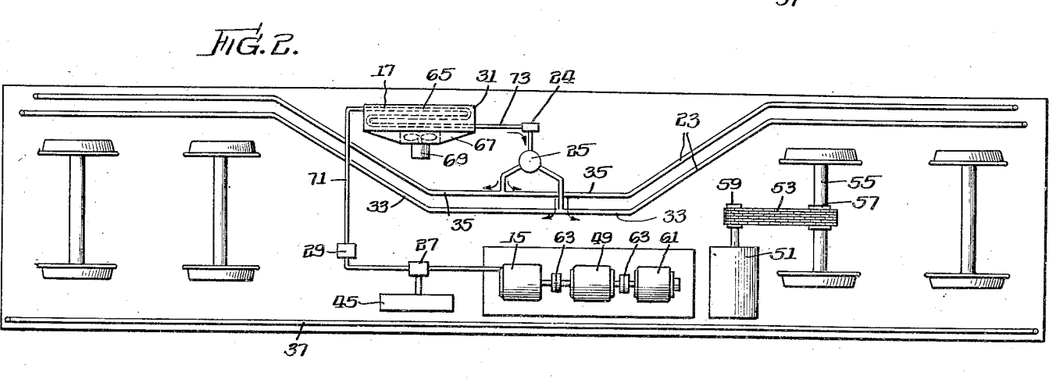
Figure 2 is a sectional view taken substantially along the line 2—2 in Fig. 1.

The temperature control apparatus includes blowers 38 for circulating the air in the car, said blowers, as shown in Figure 1 of the drawings, being preferably located at opposite ends of the car with their intakes near the ceiling of the compartment 12, and arranged to direct currents of air downwardly through the conduits 39, the discharge ends of which are located adjacent the floor of the car and are provided with heating elements 41. The control apparatus also includes thermostatically operated devices preferably located within the car in any suitable or convenient position. These devices, as shown in Figure 1 of the drawings, are carried by a suitable support 43 mounted on the ceiling of the compartment. Suitable connections are provided whereby the thermostatically operated devices may selectively control the operation of the cooling coils 19, the cold storage devices 21, the blowers 38, the heating elements 41 and the compressor 15. This control apparatus preferably comprises electrical circuits and circuit-switching means conveniently located in a control cabinet 45 preferably located on the underside of the car bottom.

Means is also provided for powering the refrigerating system, the blowers, and the heating elements from one of the car axles or alternatively from an external source of power. The compressor 15, which may be of any preferred form and type, is preferably supported on a suitable frame 47 mounted beneath the central portions of the car, the frame being of open construction in order to permit air to circulate around the compressor in order to cool the same. The compressor is drivingly connected with a direct current motor 49, which, in turn, is provided with suitable electrical connections for deriving operating power from a constant potential, variable-speed, direct current generator 51 which delivers direct current without change in polarity no matter in which direction the car travels. The direct current motor is carried in the frame 47 with the compressor, and the generator is located in any suitable or convenient position beneath the car body and is drivingly connected as by means of the belt or chain 53 with a car axle 55. The driving element 53 operates over suitable pulleys or sprockets 57 and 59 mounted respectively on the car axle and on the shaft of the generator. The driving elements 53, 57 and 59 are so arranged that the pulley 57 may swing out of alignment with the pulley 59 when the car is traveling a curved path without interfering with the driving connection. Of course, any suitable equivalent driving device may be employed such as an extensible shaft provided with universal joints and operatively geared at its opposite ends to suitable gears on the axle and on the generator. Or the generator may be mounted directly on the truck or bogie, which carries the axle 55, and may be either drivingly connected with the axle by mechanical means, or may be built onto the axle itself, in which case the generator swings with the axle and no provision need be made for the relative displacement of the axle with respect to the generator while the car is traveling a curved path. In any event, the movement of the car, in transit, through its axle drives the generator 51 and when the car is moving at higher than a predetermined minimum speed, the generator produces current at constant potential and unchanging polarity, no matter how fast nor in which direction the car may travel. The current produced by the generator is used for driving the motor 49 and for other purposes which will hereinafter be more fully explained.

Means is also provided for driving the compressor from an external power source when the car is stationary. For this purpose, I prefer to utilize an alternating current motor 61, although other forms of motive devices may, of course, be employed if desired. The compressor, the direct-current motor 49, and the alternating current motor 61 preferably have their shafts directly coupled together as shown at 63, although, of course, if the compressor employed is other than the rotary type shown in the drawings, a direct coupling between the compressor and the motors 49 and 61 cannot be accomplished, but, in such a case, I prefer to employ a geared, belted or cranked connection for driving the compressor. Thus a suitable connection is provided whereby the alternating current motor may be electrically connected in a readily detachable manner with a source of external power in order to drive the compressor and thus operate the refrigerating system and drive the direct-current motor as a direct-current generator when the car is stationary.

If desired, the motor 49 and the motor 61 may be built as a unit as by providing an ordinary repulsion induction motor with a commutator and brushes to connect the rotor for direct current operation. Such a device can be driven as a direct-current motor by connecting its brushes with a suitable source of direct-current, as, for instance, the generator 51, or can be driven as an alternating current motor-direct current generator by connecting the induction motor leads to a suitable alternating current source. However the effect is accomplished, the motor-generator set 49, 61 provides for operating the system either by direct current produced by the motion of the car while in transit or by alternating-current when the car is stationary. In either event, the operation of the system is controlled at least in part by direct current of constant and unchanging polarity produced by the generator 51 while the car is in motion in either direction or by the motor generator combination 49, 61 when the car is stationary.

An important advantage of my present invention is that the compressor is always driven in the same direction whether the car is stationary or in motion and regardless of the direction of car travel.

The condenser 17 is preferably mounted on the outside of the car body in position exposed to the external air currents created by movement of the car in either direction in order to promote the dispatch of heat therefrom, however, the condenser may be located in any convenient position on the underside of the car body, the condenser being of compact construction so that it may be mounted adjacent the compressor. The condenser comprises one or more coils of pipe 65 provided with extended heat-radiating fins or other heat-transferring surfaces and is mounted within a suitable housing 67 through which a circulation of air may be maintained by means of the fan 69 in order to efficiently and rapidly cool the refrigerating medium compressed in the compressor and delivered thereby through the pressure limit switch 27 and the oil interceptor 29 to the condenser. The fan 69 is preferably electrically driven and suitable connections are provided for supplying the same with power from the generator 51 while the car is moving or from the motor 49 driven as a generator by the motor 61 when the system is being actuated from an external source of power. The oil intercepter 29 is positioned in the conduit 71 connecting the compressor discharge with the condenser inlet. The pressure limit switch 27 is also located in this conduit 71 between the compressor and the condenser. The oil intercepter 29 may be of any suitable or preferred form for the purpose of removing oil carried in suspension by the compressed refrigerating medium forced from the compressor and thus eliminate trouble in the condenser and other portions of the circulating system caused by the oil tracings in the circulating medium. A supply pipe 73 for the compressed and cooled refrigerating medium delivered from the condenser 17 leads into the refrigerator compartment and connects with an expansion valve 24 and thence to the valve 25 controlling the distribution of the refrigerant through the parallel circuits 33 to the coils 19, or through the parallel circuits 35 to the coils of the cold storage devices 21. The valve 25 may be of any suitable or preferred form for directing refrigerant selectively into the circuits 33 or into the circuits 35. When the refrigerant is directed through the circuits 33, the atmosphere in the car will be refrigerated by direct contact with the coils 19. When the atmosphere has thus been cooled below predetermined temperature, the thermostat devices on the mounting 43, operate through the control circuits hereinafter more completely described, to cause the valve 25 to direct the refrigerant into the circuit 35. At this time the refrigerating energy in excess of that required to cool the car down to the temperature at which the switching occurs, will be stored up in the cold storage devices 21 for future liberation whereby to maintain the atmosphere in the car in a substantially cold condition for a considerable interval after the refrigerating apparatus becomes inactive, as when the car is stationary for a period long enough to demand that the apparatus be connected for operation to an external power source.

The cold storage devices 21, as illustrated in Figure 1 of the drawings, comprise tanks 75 containing a fluid cold storage or hold-over medium, preferably brine, that is to say, a solution of salt or calcium in water and suitable conduits or coils of pipe 79 immersed in the brine and connected with the refrigerating system.

Figures 3, 6:
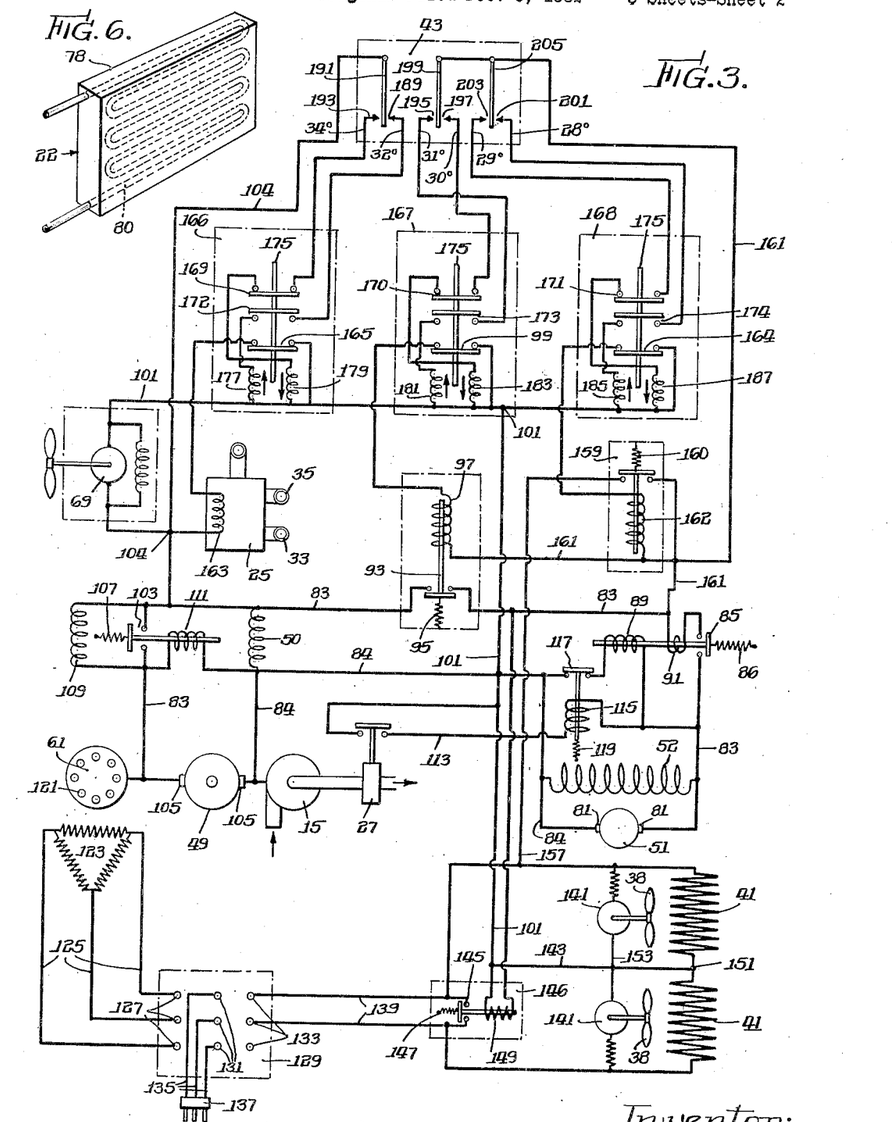
Figure 3 is a diagrammatic representation of the electric connections employed for operating and controlling the temperature regulating system illustrated in Figures 1 and 2.
Figure 6 is a perspective view of a modified form of the cold storage device.

Alternatively, as shown in Fig. 6, I propose to provide cold storage devices 22 consisting of coils 80 of suitable configuration embedded in a block 78 of relatively solid or mouldable material having a high specific heat factor. Material, such as rubber or rubber compounds, form suitable mouldable material in which to embed the coils.

In operation, the refrigerating medium flows through the coils of the cold storage unit and the cold storage medium is cooled thereby, that is to say, absorbs refrigerating energy. The amount of energy absorbable in the cold storage or hold-over unit, depends upon the specific heat of the material employed. Cold storage units made by embedding the coils in a mouldable compound, such as rubber, have a distinct advantage in that there is no corrosive fluid involved as in the case of a brine tank cold storage unit. Leakage and consequent damage to surrounding parts and apparatus is thus avoided. The cold storage or hold-over devices 21 particularly if of the alternative solid construction 22 need not necessarily be placed in the ends of the car behind the partitions 14 but may be conveniently located in any suitable or convenient positions as on the side walls or roof of the compartment 12.

In Figure 3 of the drawings, I have illustrated a schematic diagram of electrical connections whereby the several elements of the heating and cooling system are operatively connected together and the operation thereof correlated in order to automatically maintain the car in substantially cold condition between adjustable limits of maximum and minimum temperatures.

In the apparatus illustrated, the constant current, variable speed, direct-current generator 51 has a field coil 52 and is driven from the axle 55. The generator is of any suitable or preferred construction adapted to deliver direct current at constant potential and polarity from the brush terminals 81 no matter which direction the generator arm is turned by the car axle. The brush terminals are connected with conductors 83 and 84 forming direct current buses, there being a solenoid switch 85 normally biased by means of the spring 86 to open position in series in the direct current bus 83 adjacent the generator 51. The solenoid switch 85 has an operating coil 89 of the potential type, connected between the bus conductors 83 and 84 between the switch 85 and the generator terminals in order to close the switch against the bias of the spring means 86 as soon as the generator has reached a minimum operating speed to deliver its normal potential between the terminals 81. The solenoid switch 85 also has a holding coil 91 in series in the bus conductor 83 in which the switch 85 is connected so that the switch 85 will be held closed as long as current is flowing in the conductor 83. The bus conductor 83 also has a second solenoid switch 93 normally biased toward open position by the spring means 95, said solenoid switch 93 having an operating coil 97 of the potential type, one end of which is connected with the bus conductor 83 between the switches 85 and 93 and the other end of which is connected to one contact of a switch 99, the other contact of said switch being connected through the conductor 101 to the direct current bus 84 thus completing the operating circuit of the switch 93 so that the switch will be closed against the bias of its spring whenever switches 85 and 99 are closed with power on the bus conductors 83 and 84.

The direct current motor 49 has a field coil 50 and is connected between the buses 83 and 84 in such a fashion that the switches 85 and 93 control the flow of direct current along the buses between the motor 49 and generator 51.

The direct current motor 49 is provided with a starting compensator, comprising a solenoid switch 103 inserted in one of the bus-conductors between one end of the coil 50 and a brush terminal 105 of the motor. The switch is normally biased by means of the spring 107 toward open position and a starting resistance 109 is connected in parallel with the switch opening. The switch 103 has an operating coil 111 of the potential type connected between the bus conductors 83 and 84 between the switch 103 and the motor terminals. The switch 103 is closed when the back electromotive force, created by the motor in starting, has reached a predetermined value in order that, upon starting, the resistance will be in series with the armature of the motor. When the motor has reached a speed to deliver a counter electromotive force sufficient to close the switch 103 against the bias of its spring, the resistance 109 is short circuited through the switch and the full potential is delivered by the generator to the armature of the motor.

The condenser cooling-fan-motor 69 is connected with the direct current bus 83 between the motor 49 and the switch 93 by means of the conductor 104 and is connected with the direct current bus 84 as by means of the conductor 101 so that the condenser cooling-fan-motor will operate either when the car is moving with the generator 51 in operation (the switches 85 and 93 being closed) or when the car is stationary and the motor 61 is driving the motor 49 as a generator.

As heretofore described, the alternating current motor 61, and the motor 49 are preferably coupled together and both are operatively connected for driving the compressor 15 so that either the direct current motor 49 or the alternating current motor 61 may be utilized to drive the compressor. When the motor 49 is driving the compressor, the motor 61 is being driven in a substantially idle condition. When the motor 61 is employed to drive the compressor, it will also drive the armature of the motor 49, which, being of the direct current type, will operate as a direct current generator. In other words, when the car is stationary and the motor 61 is being driven from a source of external power, the driven motor 49, operated as a direct current generator, will supply direct current to the bus bars 84, for a purpose which will hereinafter be more fully described. The motor 61 is preferably of the squirrel cage type having a rotor 121 and stationary windings 123 of any suitable form for causing the rotor to turn when alternating current is applied to the windings. As illustrated in Figure 3 of the drawings, the windings 123 form a three-phase delta connection to which three-phase alternating current is supplied by means of the conductors 125, which are connected between the windings 123 and the poles 127 of a selector switch 129. The switch illustrated is of the triple-pole, double-throw type having switch blades pivoted to the central blade supports 131 in position to swing selectively into engagement with the blade-receiving terminals 127 or into engagement with the blade-receiving terminals 133. The blade-carrying terminals 131 are connected to the conductors 135, which terminate in a suitable outlet 137 by which a detachable electrical connection may be made between the conductors 135 and an external source of alternating current power whereby when the switch blades are positioned in contact with the blade-receiving terminals 127, alternating current power may be fed through the conductors 135 and 125 to the motor 61.

The outlet of the compressor is connected with the pressure-limiting switch 27. This switch is normally open but is adapted to close when the pressure in the discharge line of the compressor exceeds a predetermined value. The normally open switch is in a circuit 113 extending from the bus connector 84 to the bus connector 83 between the switch 85 and a terminal 81 of the generator and includes the operating coil 115 of a solenoid switch 117, which is in series in the operating circuit of the coil 89 which operates the switch 85. The switch 117 is normally biased toward closed position as by the spring 119 so that as long as the pressure in the discharge line of the compressor does not exceed the predetermined maximum, the switch 27 will be open and the switch 117 will be closed so that the coil 89 may hold the switch 85 in closed position so long as the generator 51 is in operation. If, for any reason, the pressure in the discharge line becomes dangerously high, the switch 27 will close, causing the coil 115 to open the switch 117 against the urge of its spring, thus rendering the coil 89 inoperative and permitting the switch 85 to open. This will prevent electrical power from being delivered from the generator to the motor which will cause the same to slow up and relieve the excessive pressure in the discharge line of the compressor.

If desired, the pressure-limiting switch 27 may also be provided with means for controlling the operation of the motor 61 in order to provide a similar protection against excessive pressures in the discharge line of the compressor when the same is being driven by the motor 61.

Two of the blade-receiving contacts 133 are connected by means of suitable conductors 139 to the heaters 41, which are preferably connected in series between the conductors 39. The blowers 38 are operated by electric motors 141, which also are preferably connected in series between the spaced conductors 139 so that when the blades of the switch 129 are in engagement with the blade-receiving conduits 133, one phase of the alternating current power supplied from the external power source through the outlet 137 will be applied for driving the motors 141 and for operating the heaters 41.

The conductor 151, which joins the heaters and the conductor 153, which joins the motors, are connected to the bus conductor 84 as by means of a conductor 143 connecting with the common conductor 101 which, in turn, is connected with the direct current bus conductor 84.

Means is provided for short circuiting the conductors 139 whenever the heaters are powered from the direct current buses. This occurs only when the car is in motion and the connection by which power is supplied to the system from an external source is broken. This is to permit the blower motors and heaters to be operated in parallel by direct current produced by the generator 51 when the car is in motion and comprises a switch 145 connected for short-circuiting the conductors 143 when in closed position. The switch 145 is normally urged toward open position by means of the spring 147 and has an operating coil 149 connected between the conductors 84 and 83 between the switches 85 and 93 so that whenever power is applied to these bus conductors, as when the heaters are powered therefrom, the coil 149 will close the switch 145 against the bias of its spring and will hold the switch closed while the heaters are in operation.

One of the conductors 139 also is connected, by means of the conductor 157, through a control switch 159 and the conductor 161 to the direct current bus conductor 83 between the switches 85 and 93 so that the heater 41 and the blower motors 141 may be powered from the direct current buses 83 and 84 when the car is in transit and the system being operated by power delivered from the generator 51, it being understood that under such conditions the switches 85, 145 and 159 will be closed, thus throwing the heaters 41 and motors 141 in parallel between the bus conductors 83 and 84 carrying the potential developed by the generator 51.

The switch 159 is normally biased toward open position by means of the spring 160 and has an operating coil 162 for closing the switch against the bias of its spring. The operating coil is connected by means of the conductor 161 to the direct current bus 83 between the switches 85 and 93 and is also connected through a control switch 164 and the return conductor 101 to the direct current bus 84.

The reason for operating the heaters and blowers in parallel from the direct current system and in series from the alternating current system is that the most efficient apparatus for use in the direct current system has a voltage characteristic substantially less than the voltage available in ordinary commercial power lines carrying alternating current so that it is preferable to design the direct current apparatus having a voltage such that the heaters and motors can be operated in parallel with the full direct current voltage across each heater and blower element and can be operated in series when connected in the alternating current system.

If desired, however, the connections may be made to permit operation of the heaters and blowers in series when connected to the direct current system simply by omitting the switch 146 and its connections and by omitting the conductor 143 while connecting the conductor 101 to the conductor 139 other than the one with which the conductor 157 is connected. Suitable connections also may be provided for operating the alternating current system from commercial power lines having different alternating current voltages.

The temperature regulating control valve 25 is normally biased, preferably by gravity, to direct the refrigerating medium into the parallel circuits 33, which include the direct cooling coils 19. The valve has a coil 163 for shifting the valve against its bias to condition it to deliver the refrigerating medium into the parallel circuits 35. The coil 163 is connected through a switch 165 and the return conductor 101 to the direct current bus conductor 84 and is also connected by means of the conductor 104 to the direct current bus conductor 83 between the motor 49 and the switch 93 so that when the switch 165 is closed, the coil 163 may be actuated from the direct current system either when the generator 51 is supplying current to the system or when the motor 49 is driven as a generator 51 by the motor and is supplying the current to the system but cannot be operated when the switch 93 is open with the power being supplied by the generator 51. It will be noted also that the operating coils 97 of the switch 93 and 162 of the switch 159 can be actuated only when the generator 51 is supplying power to the direct current system and cannot be operated when the motor 49 is operating as a generator to supply power to the system.

The operation of the system is controlled from thermostatic means mounted on the support 43, the devices to be controlled including the magnetic valve 25, the heating elements and fans 141 and the switches 95 and 159.

It will be noted that these devices are thermostatically controlled in the illustrated embodiment only when the direct current system is in operation, that is to say, when the car is in transit. It is ordinarily unnecessary to control the heating and cooling devices when the car is stationary for the reason that it is unnecessary to limit the cooling effect applied to the car while it is waiting to receive a load of freight. Even if the car is cooled substantially below the temperature at which the freight is to be maintained, the precooled car will become heated to a certain extent during the loading operation, for which reason, it is unecessary to limit the pre-cooling except, insofar as there is a natural limit of temperature to which the car may be pre-cooled, which natural limit will depend upon the natural limit of the cooling apparatus and the temperature at which the precooling is accomplished. Neither is it necessary to control the pre-heating of the car for similar reasons. I, therefore, do not show any means for controlling the extent of the pre-heating or pre-cooling which may be accomplished when the system is operated from an external power source when the car is stationary. However, it is obvious that the devices, which control the operation of the system in response to temperature changes in the car, may be arranged to operate when the system is operated from an external power source when the car is stationary.

The temperature control is effected from the thermostatic means which is carried on the support 43 through switching devices controlled by the thermostatic means. The switching devices in turn control the operation of the switch 95. This latter switch in turn controls the operation of the refrigerating system. The switching devices also control the switch 159, which controls the operation of the heating devices. The switching devices also control the valve 25, which controls the delivery of the refrigerating medium either to the direct cooling coils 19, or to the cold storage devices 21.

It is desired that the switch 93 be closed in order to maintain the refrigerating system in operation, that is to say, in order to drive the condenser, cooling-fan-motor 69 and the motor 49 when the valve 25 is gravity-actuated so as to deliver the refrigerating medium to the coils 19, as long as the temperature within the car exceeds a predetermined temperature, for example about 34 degrees Fahrenheit. It is further desired to actuate the valve 25 in order to deliver the cooling medium to the cold storage devices 21 at a predetermined temperature, about 32 degrees Fahrenheit, in order to store up the cooling energy, in excess of that required to maintain the temperature below 32 degrees Fahrenheit. By doing this, the stored energy may later be used in maintaining the temperature of the car below 34 degrees Fahrenheit for an appreciable period while the car is standing idle and before the cooling system is operated from the external power source. It is further desired to cause the switch 93 to open, thus rendering the cooling system inactive, when the temperature within the car reaches about 30 degrees Fahrenheit; and it is desired further to place the heaters 41 and blowers 141 in operation by closing the switch 159 when the temperature within the car reaches about 28 degrees Fahrenheit. After the heating apparatus has been in operation long enough to raise the temperature in the car to about 29 degrees Fahrenheit, it is desired to open the switch 159 in order to render the heating apparatus inactive. If the temperature within the car continues to rise, it is desired to again close the switch 93 when a temperature of about 31 degrees Fahrenheit is reached; and to switch the valve 25, when a temperature of about 34 degrees Fahrenheit is reached, in order to again deliver the refrigerating medium to the direct cooling coils 19. The switches 93 and 159 and the operating coil 163 may, of course, be controlled to operate at other than the temperatures specified but the foregoing temperature range is mentioned merely to indicate the sequence of operation of the various devices.

In order to accomplish this desired sequence of operation, a plurality of control switches are employed. In the illustrated embodiment, these control switches are arranged in groups, the several groups 166, 167, and 168 preferably being mounted on separate panels and each group including one of the control switches 99, 164, and 165. Each group also includes switches 169, 170, and 171 adapted to open and close with the corresponding control switch of its group. Switch 169 opens and closes with switch 165. Switch 170 opens and closes with switch 99, and switch 171 opens and closes with switch 164. Each group also has a switch 172, 173, and 174, which is adapted to open when the corresponding control switch of the group is closed. Switch 173 is open when the switch 99 is closed, and switch 174 is open when switch 164 is closed. The shiftable elements of the switches of each group are carried on members 175 by means of which the switches may be moved to open and closed position. Each group of switches has associated with it a pair of operating coils; group 166 having operating coils 177 and 179; group 167 having operating coils 181 and 183; and group 168 having operating coils 185 and 187. The coils 177, 181, and 185 are adapted to move their corresponding members 175 upwardly to close the operating switches 99, 164, and 165, and the operating coils 179, 183 and 187 are adapted, when actuated to move the members 175 downwardly, to open the switches 99, 164, and 165. The coils 177, 179, and 181, 183, 185, and 187 are connected through the return connector 101 to the direct-current bus conductor 84 while the coil 177 is connected through the switch 172 to a contact 189 of a thermostat device carried by the panel 43. The blade 191 is connected by means of the conductor 104 to the direct-current bus 83 between the switch 93 and the motor 49. This enables the coils 177 and 179 to be energized either when the car is in transit or when it is stationary. When the car is in transit, the direct-current generator 51 delivers power to the buses 83 and 84. When the switch 93 is closed, the power delivered by the generator may be applied to the circuits which includes the coils 177 and 179. When the switch 93 is open, however, the power developed by the generator cannot be applied to the circuits including these coils. This, however, is not a disadvantage because the refrigeration system, when operated from the generator 51, is out of commission when the switch 93 is open and does not require temperature control of the switch 25. When the car is stationary and the alternating current motor 61 is driving the motor 49 as a direct-current generator, power will be delivered by the direct-current motor, operating as a generator, to the buses 83 and 84 and this power is always available to energize the circuits including the coils 177 and 179 whether or not the switch 93 is closed. In this way, the switch 25 is thermostatically controlled whenever the refrigeration system is in operation. The blade 191 is adapted to operate between the contact 189 and a second contact 193, which is connected to the switch 169 to the operating coil 179. The coils 181 and 183 are connected respectively through the switches 173 and 170 to the spaced contacts 195 and 197 of a second thermostat unit carried on the panel 43, and the blade 199 of which unit is connected by means of the return conductor 161 to the direct-current bus conductor 83 between the switches 85 and 93 so that the coils 181 and 183 may be selectively controlled to operate the switches of group 167 only when the car is in transit, i. e., when the generator 51 delivers power to the direct-current system and not when the motor 49 is delivering power to the system during which period the switch 93 is also open. The coils 185 and 189 are connected respectively through the switches 174 and 171 to the stationary contacts 201 and 203 of a third thermostat carried by the panel 143, the blade 205 of which thermostat is connected through the conductor 161 to the direct-current bus 83 so that the coils 85 and 87 may be powered from the direct-current system only when the car is in transit.

*Operation*

In operation, the blade 191 is arranged to engage the contact 189 when the temperature within the car is 32 degrees Fahrenheit and to engage the contact 193 when the temperature within the car is 34 degrees Fahrenheit. The blade 199 is arranged to engage the contact 195 when the temperature within the car is 31 degrees Fahrenheit and to engage the contact 197 when the temperature is 30 degrees Fahrenheit; and the blade 205 is arranged to engage the contact 203 when the temperature is 29 degrees Fahrenheit and to engage the contact 201 when the temperature is 28 degrees Fahrenheit.

When the temperature within the storage compartment is 34 degrees, the switch 165 is open under the influence of the coil 177; the switches 169 and 172 are respectively open and closed and the coil 163 of the valve 25 is de-energized. In this condition, the valve is gravity-actuated to deliver the refrigerating medium into the circuit 33 leading to the direct cooling coils 19. If the temperature within the car falls below 34, the blade 191 releases the contact 193 but does not affect the condition of the switches in group 166 until the blade engages the contact 189 which occurs when the temperature within the car is 32 degrees. At this time, the coil 177 is energized through the switch 172 and causes the switch 165 to close, thus completing the circuit for energizing the coil 163 in order to condition the valve 25 to deliver the refrigerating medium to the circuits 35 and thereby deliver the refrigerating energy to the cold storage units 21. When the temperature within the storage compartment reaches 31 degrees, the switch 99 is closed under the influence of the coil 181, switches 170 and 179 being respectively closed and opened.

If the temperature in the storage compartment falls below 31 degrees, the blade 199 releases the contact 195 but this does not affect the condition of the switches of group 167 until the blade engages the contact 197 when the car temperature is 30 degrees. At this instant, a circuit is completed through the switch 170 to energize the coil 183 and thus open the switch 99, which, in turn, de-energizes the coil 97. This permits the switch 93 to open under the influence of the spring 95 in order to disconnect the motors 49 and 69 from the generator. Since these motors drive the compressor and the condenser cooling fan, the opening of switch 93 renders the refrigerating system inactive. When the temperature within the storage compartment reaches 29 degrees, the switch 164 is open under the influence of the coil 187, the switches 171 and 174 being respectively open and closed. If the temperature in the storage compartment falls below 29 degrees, the blade 205 releases the contact 203 but this does not affect the condition of the switches of group 168 until the blade engages the contact 201, which occurs when the temperature within the car is 28 degrees Fahrenheit. When the blade 205 engages the contact 201, a circuit is completed through the switch 174 to energize the coil 185 and thus to close the switch 164. When the switch 164 closes, the operating coil 162 is energized and causes the switch 159 to close against the tension of the spring 160. This completes a circuit through the conductor 157 in order to operate the heaters 41 and blowers 141 from the direct-current buses 83 and 84.

When the temperature within the storage compartment is less than 29 degrees Fahrenheit, the switch 164 is closed, switches 171 and 174 being respectively closed and open. If the temperature within the storage compartment rises above 29 degrees Fahrenheit, the blade 205 releases the contact 201 but this does not affect the condition of the switches of group 168 until the blade reaches the contact 203. When this occurs, a circuit is completed through the switch 171 to energize the coil 187 thus opening the switch 164 and breaking the circuit energizing the operating coil 162. This permits the switch 169 to open under the influence of the spring 160 and breaks the circuit by which the heaters and blowers are energized. As the temperature continues to rise, at 30 degrees, the switch 99 is open under the influence of the coil 183. If the temperature rises above 30 degrees, the blade 199 releases the contact 197 but this does not affect the condition of the switches in group 167 until the blade engages the contact 195.

When this occurs, a circuit is completed through the switch 173 to energize the coil 181 in order to close the switch 99. This completes a circuit through the operating coil 97 which closes the switch 93 against the tension of the spring 95 thus permitting power to be delivered from the generator 51 to the compressor-driving-motor 41 and to the condenser-cooling-motor 69 and places the refrigerating system again in operation. When this occurs, the refrigerating energy is delivered to the cold storage devices 21.

If the temperature continues to rise, at 32 degrees, the switch 165 remains closed under the influence of the coil 177. This keeps the valve 25 in a position delivering the refrigerating medium to the cold storage devices 21. As the temperature in the car rises above 32 degrees, the blade 191 releases the contact 189 but this does not affect the switches of group 166 until the blade engages the contact 193 at which time a circuit is completed through the switch 169 and the coil 179 which results in opening the switch 165 and breaking the circuit through the coil 163. The valve 25 then responds to its bias and shifts the delivery of the refrigerating medium to the direct-cooling coil 19 in order to apply the full force of refrigerating energy to the car in order to utilize the entire capacity of the refrigerating system to directly refrigerate the car in order to maintain its temperature at or below 34 degrees.

It should be understood, of course, that the thermostats may be adapted to have the blades 199 and 205 thereof engage their contacts 189, 193, 195, 197, 201 and 203 at any desired temperature in order to adjust the temperatures at which the controlled devices operate, the specific temperatures mentioned merely being to facilitate the description of the sequential operation of the several elements of the system.

Figures 4, 5:
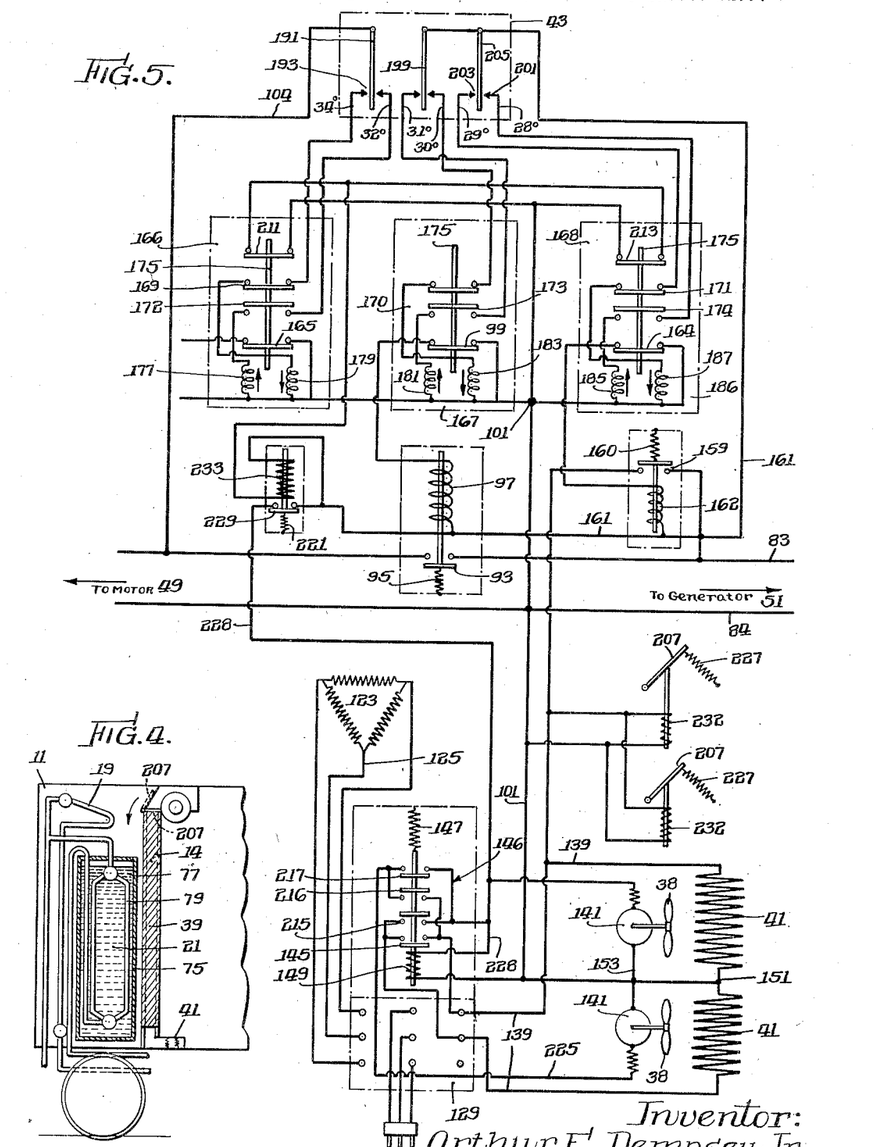
Figures 4 and 5 illustrate modified arrangements embodying the invention.

In some cases, it is desirable to arrange the blowers 38 to circulate the air within the car when the direct cooling coils 19 are in operation in order to obtain a maximum cooling effect at such time. This may be accomplished as shown in Fig. 4 by providing the blowers 38 with a shutter 207 at the upper end of the conduit 39 to direct the flow of air delivered by the blowers either into the upper end of the conduit 39 or directly out through an opening above the cooling coils 19. When the air is thus blown onto the cooling coils, it passes downwardly thereof behind the bulkheads 14 and enters the storage chamber at the bottom through the openings 16. Of course, it is undesirable to operate the heaters when the blowers are in operation to circulate the air past the cooling coil 19, and so I have shown in Figure 5 of the drawings a schematic wiring diagram showing the changes and additions which may be made in the arrangement shown in Figure 3 in order to permit the blower motors 141 to operate alone when the cooling coils 19 are in operation and to operate in conjunction with the heaters when it is desired to deliver heat to the storage compartment. It is also desirable to interconnect the heaters and blowers for operation from the external power source and this arrangement also is shown in Figure 5. The heaters and blowers are arranged for parallel operation when powered from the direct current bus connectors 83 and 84 and means is also provided for operating the motors in series and the heaters in series between one phase of the alternating current system when the car is stationary.

In Figure 5 of the drawings, the switch groups 166 and 168 are each provided with an additional switch; group 166 having the switch 211, while group 168 has the switch 213. The switch 146 also is provided with circuit-control elements 215, 216 and 217 in addition to the circuit control element 145. The circuit control elements 215 and 216 are adapted to be opened and the circuit element 217 to be closed when the circuit control element 145 is closed. Under the influence of the spring 147 the switches 145 and 217 are normally urged open and the switches 215 and 216 urged closed. One side of the control elements 216 and 217 are connected together and both are connected, by means of a conductor 228, through a switch 229 and the conductor 161 to the direct-current bus conductor 83 between the switches 85 and 93. The switch 229 is normally biased toward open position by means of the spring 221. The operating coil 149 of the switch is also connected between the conductors 84 and 83, between the switches 85 and 93, one side of said coil being connected to the common conductor 101 leading to the bus 84 while the other side is connected to the conductor 228 leading through the switch 229 and the conductor 161 to the bus 83. The switch 229 may be closed against its bias when its operating coil 233 is energized. One side of the coil 233 is connected to the direct-current bus conductor 83 between the switches 85 and 93 via the conductor 161 and its other side is connected to one side of both of the switches 211 and 213 in parallel, the other sides of said switches being connected in parallel and to the direct-current bus conductor 84 via the conductor 101. The circuit-control elements 145 and 215 also, on one side thereof, are connected together and to one of the conductors 139 leading to the heating elements 41. The remaining sides of the circuit-control elements 145 and 216 are connected together and to the other of the conductors 139 while the remaining sides of the circuit-control elements 215 and 217 are connected together and, through the conductor 225, to one of the blower motors 141. The other blower motor is connected to the conductor 228 leading to the switch 229. Each blower control shutter 207 is normally urged by means of a spring 227 toward a position in which the corresponding blower delivers a current of air through its cooperating cooling device 19 but the shutters may be shifted, when their corresponding operating coils 232 are energized, to positions in which the blowers deliver air directly through the heaters 41. The operating coils 232 are connected for parallel operation, being preferably in parallel relationship with the heater coils 41, and hence are controlled through the switch 159. Whenever the switch 159 closes to place the heaters in operation, the shutters 207 will be pushed against the bias of their springs 227 to direct the air from the blowers through the heating devices.

When the blade 205 engages the contact 203 and opens the switch 159 to discontinue the heaters from operation, the springs 227 will draw the shutters to a position directing air from the blowers onto the cooling coils. The switch 229 is normally open but will be closed by the operating coil 233 when either of the switches 211 or 213 is closed, in order not only to energize the coil 149 and actuate the switch 146 against the spring 147 to close the contacts 145 and 217 and connect the motors 141 and heaters 41 for parallel operation, but also to supply current for driving the motors. The switch 211 will close whenever the blade 191 engages the contact 189 and will open when the blade engages the contact 193, i. e., when maximum cooling effect is desired. The switch 213 also will be closed whenever the blade 205 engages the contact 201, i. e., when maximum heating is desired and will open when the blade engages the contact 203. In other words, the blower motors 141 will be actuated whenever the cooling coil 19 is in operation. At the same time, the shutters 207, under the influence of the springs 227, will cause the blowers to direct air against said cooling coils. The blower motors 141 also will operate whenever the heaters 41 are in operation but, at such time, the actuating coils 232 will have shifted the shutters 207 against the urge of springs 227 to a position such that the air currents delivered by the blowers will travel past the heating elements and thus deliver warm air into the storage compartment. When the car is stationary and the device operating from an external power source, the switches 215 and 216 will be closed by the spring 147, thus connecting the blower motors in series and the heating elements in series and both sets together for operation in parallel from one phase of the alternating-current system.

After the external power source is disconnected and the car is in transit, the spring 147 of the switch assembly 145 will yield, to permit the circuit-control elements 215 and 216 to open and the circuit controls 145 and 217 to close and thus isolate the blowers from the heaters and connect the blowers in parallel and the heaters in parallel for operation as heretofore described from the direct-current buses 83 and 84 whenever the switch 229 closes.

The present application comprises a division of my co-pending application Serial Number 645,552, filed December 3, 1932.

I claim:

1. In a refrigerator car, the combination of refrigerating means, heating means, and means to operate the heating and refrigerating means selectively by means of power furnished by the movement of the car, or by means of power from an external source when the car is stationary, said heating means comprising a pair of sections adapted to be operated in parallel by the power furnished by the car movement and in series by the power furnished from the external source.

2. In a temperature control for moving cars, the combination with heating means, of means to operate the heating means by means of power furnished by the movement of the car and selectively by means of power from an external source when the car is stationary, said heating means comprising a pair of sections adapted to be operated in parallel by the power furnished by the car movement and in series by the power furnished from the external source.

3. In a refrigerator car, an electric generator driven by the movement of the car, a heating device, connections including switch means for powering said heating device from said generator, an air-circulating device having a driving motor, electrical connections including switch means for powering said motor from said generator, refrigerating means including a direct-cooling element and a cold-storage element, a compressor and a condenser and electrically actuated means for selectively connecting the compressor and condenser alternatively in circulating systems including one the cooling element and another the cold-storage element, connections including switching means for powering the electrically operated means from the generator, a motor for driving the compressor and motor driven means for cooling the condenser, electrical connections including switch means for powering said motors from the generator and temperature responsive devices for selectively actuating the several switch means.

4. In a mechanical refrigerator car, an electric generator driven by the movement of the car, air-conditioning means, and means receiving power from the generator for actuating the air-conditioning means and including an electric motor, operable devices for controlling the conditioning means, and means adapted to be actuated from a source of power other than the generator and operatively connected to drive said motor as a generator to supply electrical power for actuating the operable devices when the generator is inactive as when the car is stationary.

5. In a refrigerator car, the combination as set forth in claim 4, wherein said air conditioning means comprises a heater, a mechanical refrigerator comprising refrigerant circulating means including a condenser, a compressor and an evaporator, and wherein said operable devices including control means for the heater and for the refrigerator and thermoresponsive switch means operatively associated with the control means for controlling the operation thereof in response to temperature conditions prevailing in said car.

6. In a refrigerator car, the combination as set forth in claim 4, wherein said air conditioning means comprises a heater, a mechanical refrigerator comprising refrigerant circulating means including a condenser, a compressor and an evaporator, and circulating means for circulating a transfer medium in heat exchange relationship with the heater and refrigerator, and a remote space in said car to be air conditioned, and wherein said operable devices for controlling the conditioning means comprise thermoresponsive control means under the influence of temperature conditions prevailing in said remote space, said thermoresponsive means being operatively connected to control the operation of the circulating means, the heater and the refrigerator.

7. In a refrigerator car, the combination as set forth in claim 4, wherein said air conditioning means comprises a heater, a mechanical refrigerator comprising refrigerant circulating means including a condenser, a compressor and an evaporator, and circulating means for circulating a transfer medium in heat exchange relationship with the heater and refrigerator and a remote space in said car to be air conditioned, and wherein said operable devices for controlling the conditioning means comprise separate switches controlling the circulating means, the heater and the refrigerator, and thermoresponsive control means influenced by the temperature condition prevailing in said remote space and operatively connected to actuate said switches.

8. In combination with a propellable vehicle having a compartment adapted to be conditioned as to temperature, a temperature conditioning means therefor including a heater, a circulating device for a temperature conditioning medium and operable devices in association with the circulating devices, a direct current device drivingly associated with said circulating device to drive the same when the car is in motion, means operable when the car is in motion to deliver direct current to said operable devices and said heater and the direct current device, and alternating current means drivingly associated with the circulating device and with the direct current device to drive the same when the vehicle is stationary whereby the direct current device produces power for the operation of the operable devices and the heater.

9. In combination with a propellable vehicle having a compartment adapted to be conditioned as to temperature, a temperature conditioning means therefor including a heater, a circulating device for a temperature conditioning medium, and operable devices in association with the circulating device, a direct current generator driven from the car axle, a direct current device drivingly associated with the circulating device, means to connect the generator to deliver power to said direct current device, to said heater, and to the operable devices in association with the circulating device, and an alternating current motor adapted to be energized from an external source of power when the car is stationary and drivingly associated with the circulating device and with the direct current device to drive the same when the vehicle is stationary whereby the direct current device furnishes direct current power for the operation of the operable devices and the heater.

10. The combination with a vehicle having a compartment, of air-conditioning means for said compartment, including heating means and a mechanical refrigerator comprising a fluid-forcing device and a refrigerant circulating system, a generator, means for connecting the generator with an axle of said vehicle whereby the generator is driven in response to the movement of the vehicle when in transit, a motive means drivingly connected with the fluid-forcing device of the refrigerator, means forming connections between the motive means and the generator whereby to drive the motive means and thus cause the fluid-forcing device to circulate refrigerant in said system, thermostatically controlled means associated with said connections for applying power developed by said generator to actuate said heating means, means whereby the refrigerant is circulated in said system in one direction only regardless of the driven direction of the generator, means to drive the fluid-forcing device of the refrigerator and the drivingly connected motive means independently of said generator when the vehicle is stationary whereby to circulate the refrigerant in said system and to operate the motive means as a power generator for actuating the heating means, and means for disabling the connections between the generator and the motive means when the latter is so driven as a power generator.

11. The combination with a vehicle having a compartment, of air-conditioning means for said compartment, including heating means and a mechanical refrigerator comprising a fluid-forcing device and a refrigerant circulating system, a generator, means for connecting the generator with an axle of said vehicle whereby the generator is driven in response to the movement of the vehicle when in transit, a motor drivingly connected with the fluid-forcing device of the refrigerator, means forming connections between the motor and the generator whereby to drive the motor and thus cause the fluid-forcing device to circulate refrigerant in said system, thermostatically controlled means associated with said connections for applying power developed by said generator to actuate said heating means, means to drive the fluid-forcing device of the refrigerator and the drivingly connected motor independently of said generator when the vehicle is stationary whereby to circulate the refrigerant in said system and to operate the motor as a power generator for actuating the heating means, and means for disabling the connections between the generator and the motor when the latter is so driven as a power generator.

12. The combination with a vehicle having a compartment, of air-conditioning means for said compartment, including heating means and a mechanical refrigerator comprising a fluid-forcing device and a refrigerant-circulating system, a generator, means for connecting the generator with an axle of said vehicle whereby the generator is driven in response to the movement of the vehicle when in transit, a motor drivingly connected with the fluid-forcing device of the refrigerator, means forming connections between the motor and the generator whereby to drive the motor and thus cause the fluid-forcing device to circulate refrigerant in said system, thermostatically controlled means associated with said connections for applying power developed by said generator to actuate said heating means, means whereby said motor is driven at constant speed regardless of generator speed, means to drive the fluid-forcing device of the refrigerator and the drivingly connected motor independently of said generator when the vehicle is stationary whereby to circulate the refrigerant in said system and to operate the motor as a power generator for actuating the heating means, and means for disabling the connections between the generator and the motor when the latter is so driven as a power generator.

13. The combination with a vehicle having a compartment, of air-conditioning means for said compartment, including heating means and a mechanical refrigerator comprising a fluid-forcing device and a refrigerant circulating system, a generator, means for connecting the generator with an axle of said vehicle whereby the generator is driven in response to the movement of the vehicle when in transit, a motor drivingly connected with the fluid-forcing device of the refrigerator, means forming connections between the motor and the generator whereby to drive the motor and thus cause the fluid-forcing device to circulate refrigerant in said system, thermostatically controlled means associated with said connections for applying power, developed by said generator, to actuate said heating means, means whereby said motor is driven at constant speed regardless of generator speed, means whereby the refrigerant is circulated in said system in one direction only regardless of the driven direction of the generator, means to drive the fluid-forcing device of the refrigerator and the drivingly connected motor independently of said generator when the vehicle is stationary whereby to circulate the refrigerant in said system and to operate the motor as a power generator for actuating the heating means, and means for disabling the connections between the generator and the motor when the latter is so driven as a power generator.

14. The combination with a vehicle having a compartment, of air-conditioning means for said compartment, including heating means and a mechanical refrigerator comprising a fluid-forcing device and a refrigerant-circulating system, including a cooling device, a generator, means for connecting the generator with an axle of said vehicle whereby the generator is driven in response to the movement of the vehicle when in transit, a motor drivingly connected with the fluid-forcing device of the refrigerator, means forming connections between the motor and the generator whereby to drive the motor and cause the fluid-forcing device to circulate refrigerant in said system through said cooling device, thermostatically controlled means for preventing circulation of the refrigerant through said cooling device when said compartment is below a predetermined temperature, thermostatically controlled means associated with said connections for applying power, developed by said generator, to actuate said heating means whenever the compartment is below a predetermined temperature, means to drive the fluid-forcing device of the refrigerator and the drivingly connected motor independently of said generator when the vehicle is stationary whereby to circulate the refrigerant in said system and to operate the motor as a power generator for actuating the heating means, and means for disabling the connections between the generator and the motor when the latter is so driven as a power generator.

15. In a mechanical refrigerator car, an electric generator driven by the movement of the car, air conditioning means comprising a mechanical refrigerator system having a direct cooling element, and an indirect cooling element and heating means, electromotive means adapted to be energized by power from the generator for actuating the mechanical refrigerator, operable devices for controlling the operation of the direct and indirect cooling elements and the heating means, including thermoresponsive means operable to permit the heating means to operate only when the mechanical refrigerator is inactive and vice versa, said thermoresponsive means being also operable, when the mechanical refrigerator is in operation, to permit selective operation of the direct and indirect cooling elements, and means to supply electrical power for the actuation of the mechanical refrigerator, the heating means and the operable control devices from a source of power other than the generator when the same is inactive as when the car is stationary.

ARTHUR E. DEMPSEY, Jr.